(12) United States Patent
Caruso

(10) Patent No.: US 9,821,856 B1
(45) Date of Patent: Nov. 21, 2017

(54) FOLDABLE MUD FLAPS

(71) Applicant: Anthony Michael Caruso, Farmingdale, NJ (US)

(72) Inventor: Anthony Michael Caruso, Farmingdale, NJ (US)

(*) Notice: Subject to any disclaimer, the term of this patent is extended or adjusted under 35 U.S.C. 154(b) by 0 days.

(21) Appl. No.: 15/354,442

(22) Filed: Nov. 17, 2016

(51) Int. Cl.
*B62D 25/18* (2006.01)
*B62D 25/16* (2006.01)

(52) U.S. Cl.
CPC ......... *B62D 25/188* (2013.01); *B62D 25/163* (2013.01); *B62D 25/182* (2013.01)

(58) Field of Classification Search
None
See application file for complete search history.

(56) References Cited

U.S. PATENT DOCUMENTS

| | | | | |
|---|---|---|---|---|
| 4,103,918 A * | 8/1978 | Salden | ................. | B62D 25/188 16/307 |
| 5,199,742 A * | 4/1993 | Gotz | ..................... | B62D 25/18 280/851 |
| 6,799,808 B1 * | 10/2004 | Walters | ............... | B62D 25/188 280/851 |
| 7,290,826 B2 * | 11/2007 | Dempsey | ................. | B60J 11/00 150/166 |
| 8,465,058 B1 * | 6/2013 | Herrera | ............... | B62D 25/188 280/847 |
| 2003/0038497 A1 * | 2/2003 | Fitzgerald | ................. | B60R 5/04 296/39.1 |
| 2007/0028367 A1 * | 2/2007 | Allen | ..................... | A41D 27/12 2/244 |
| 2008/0310179 A1 * | 12/2008 | Bates | ................... | B60Q 1/2607 362/506 |
| 2010/0201153 A1 * | 8/2010 | Pesotini, Jr. | ......... | B62D 35/001 296/180.4 |
| 2012/0068448 A1 * | 3/2012 | Lasser | .................. | B62D 25/182 280/851 |
| 2015/0014976 A1 * | 1/2015 | Atkinson | ............. | B62D 25/182 280/848 |

* cited by examiner

Primary Examiner — John D Walters
Assistant Examiner — Hilary L Johns
(74) Attorney, Agent, or Firm — Stuart M. Goldstein

(57) ABSTRACT

A fully foldable mud flap has an upper flap section having a magnet permanently attached and a lower flap section having a magnet of the opposite polarity attached. The flap sections are connected by a hinge which allows rotation of the lower flap section in relation to the upper flap section, such that, in the retracted position, the lower flap section is parallel to and directly faces the upper flap section, with the magnets securing the flap sections in this position. The mud flap can be conveniently manually folded and unfolded, when desired.

15 Claims, 4 Drawing Sheets

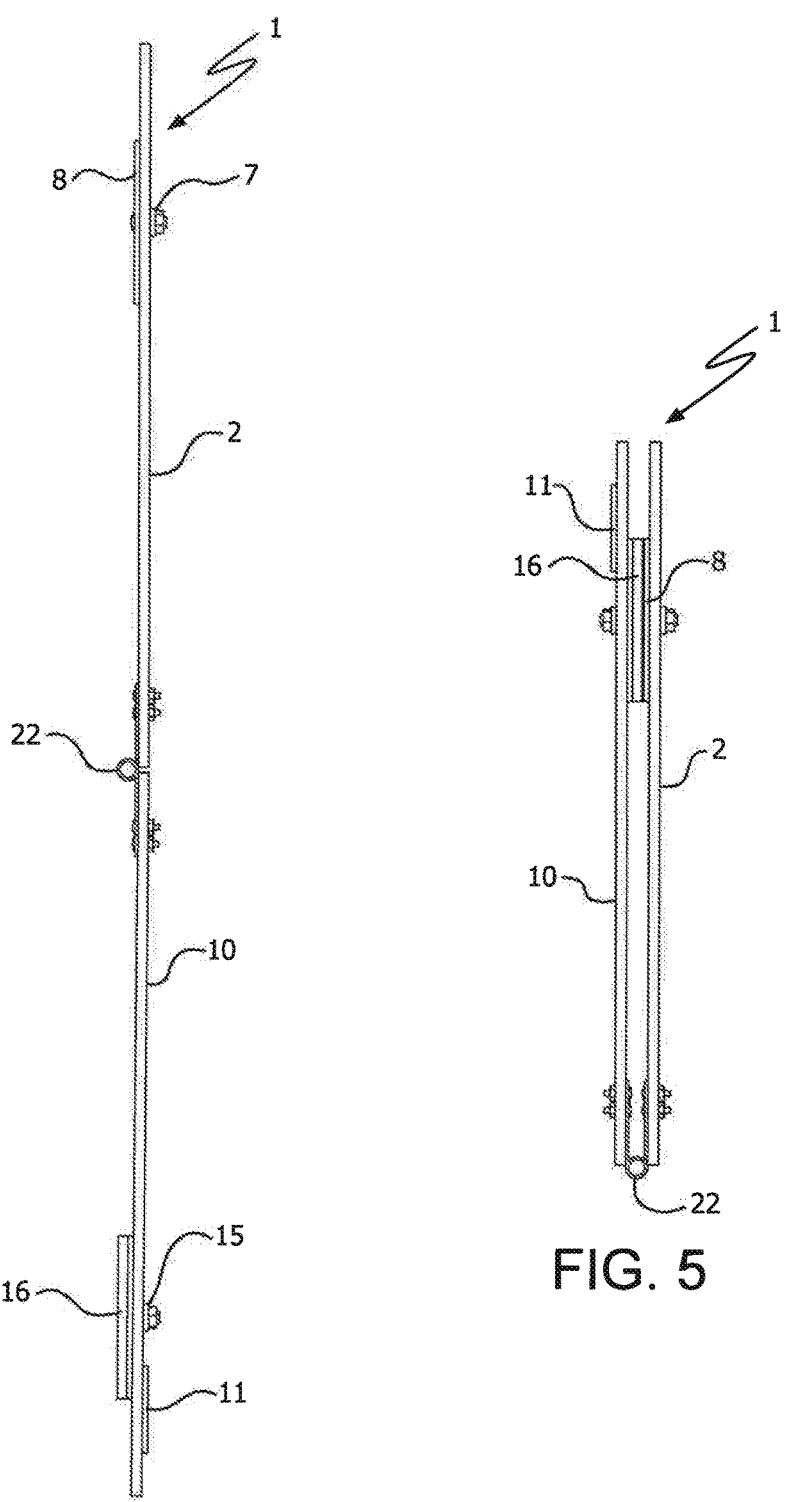

FOLDABLE MUD FLAPS

BACKGROUND OF THE INVENTION

Mud flaps are commonly located behind the rear wheels of trucks or other large vehicles. They are utilized to prevent the spraying out of mud, sand, and other road debris which may be located behind or along the side of a moving vehicle. Standard mud flaps simply extend straight down from the back of a vehicle. They are likely to wear, tear, rot, and generally sustain damage over time.

Mud flap damage is an especially serious problem for dump trucks, during their unloading operations. As the body of a dump truck is raised into dumping position, the mud flaps at the rear of the vehicle are extended further downward, into contact with the rear wheels of the truck. This often results in bending or breakage of the mud flaps, rendering them ineffective. Failure to operate such vehicles without having the required, in tact mud flaps could subject the vehicle owner to legal penalties.

There have been a number of proposed solutions to these problems, most of which involve the use of retractable mud flap systems, designed to retract or lift the mud flaps during unloading operations and then extend them down when the vehicle is in transit. Such systems, while sometimes effective, often breakdown due to the number of components involved and the rough and grimy nature of the work being done. Moreover, these mud flap retraction systems are not only an expensive add-on to vehicles, but also expensive to maintain. As a result, in many cases, broken, inoperable systems are left unrepaired, thus defeating their necessary and important purpose.

An example of one of many such systems is disclosed in U.S. Pat. No. 8,864,176. Here, an elaborate system of components is utilized to retract a hinged mud flap by partially folding and maintaining the flap in this retracted partially folded position. The system includes all the inherent problems of similar flap retraction systems, previously discussed.

SUMMARY OF THE INVENTION

It is thus the object of the present invention to overcome the limitations and disadvantages of prior systems designed to protect mud flaps from damage.

This object is accomplished by the present invention, a magnetic, fully foldable mud flap which can simply and easily be retracted to prevent mud flap interference and damage. The mud flap comprises an upper flap section having a magnet permanently attached and a lower flap section having a magnet of the opposite polarity attached. The flap sections are connected by a hinge which allows rotation of the lower flap section in relation to the upper flap section, such that, in the retracted position, the lower flap section is parallel to and directly faces the upper flap section, with the magnets securing the flap sections in this position. The mud flap can be conveniently manually folded and unfolded, when desired.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

BRIEF DESCRIPTION OF THE DRAWINGS

FIG. 4 is an elevation view of the mud flap of the present invention in its hanging position.

FIG. 5 is an elevation view of the mud flap of the present invention in its fully folded position.

DETAILED DESCRIPTION OF THE INVENTION

Figure 1:
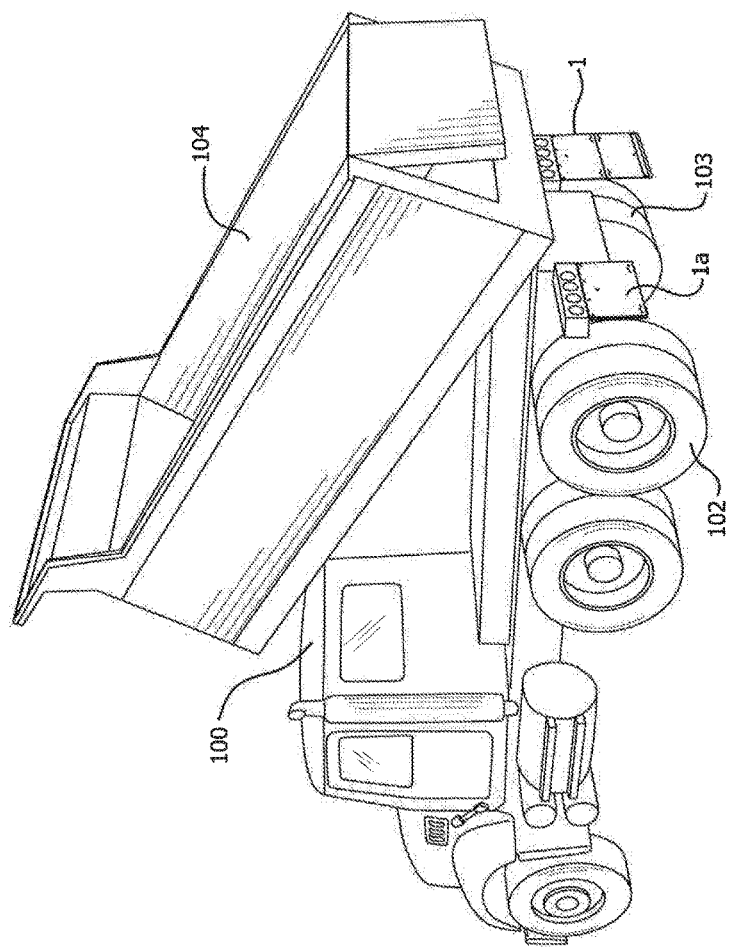
FIG. 1 shows the mud flaps of the present invention in use on a dump truck.
Figure 3:
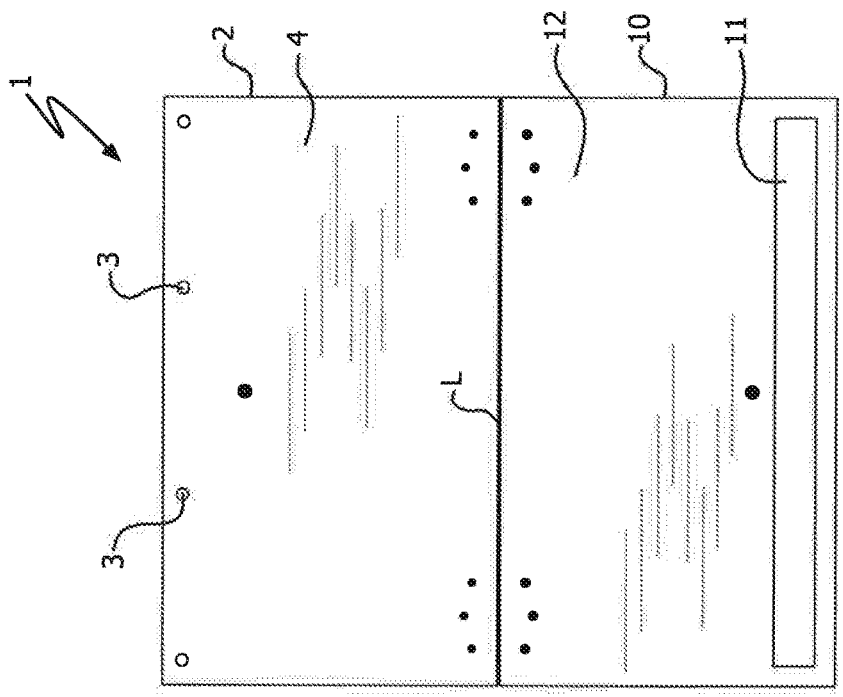
FIG. 3 is a rear view of the mud flap of the present invention in its hanging position.
Figure 2:
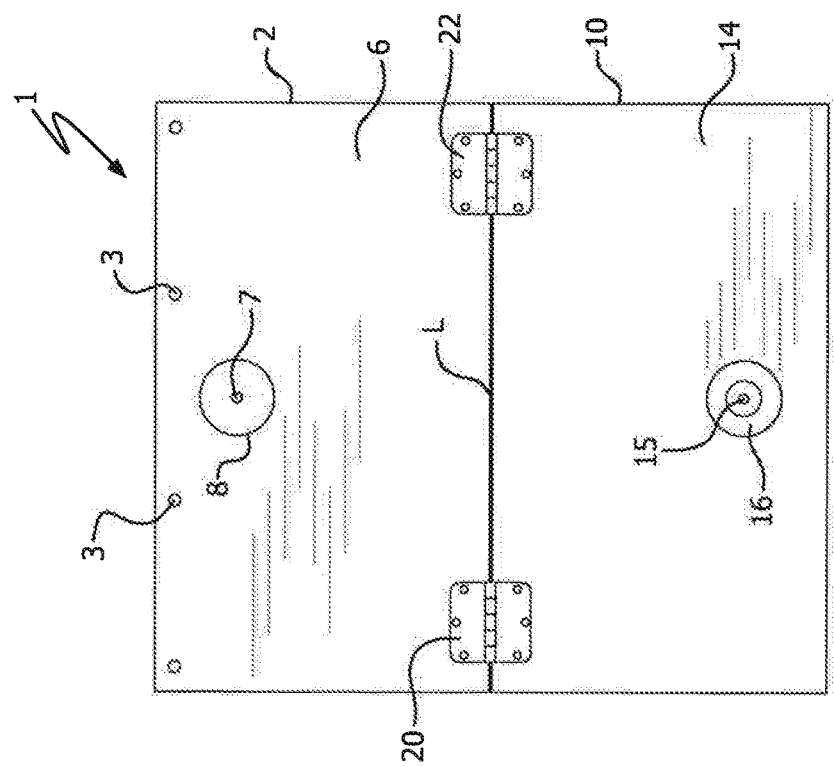
FIG. 2 is a front view of the mud flap of the present invention in its hanging position.

Mud flap 1 of the present invention comprises upper flap section 2, having front surface 4 and rear surface 6, and lower flap section 10 having front surface 12 and rear surface 14. Lower flap section 10 abuts upper flap section 2, along the length of the sections L. High strength magnet 8 is permanently attached to rear surface 6 of flap section 2 by nut and bolt 7, equivalent attachment device, or it can be molded directly into flap section 2. High strength magnet 16, having polarity opposite magnet 8, is permanently attached to rear surface 14 of flap section 10 by nut and bolt 15 or equivalent attachment device, or it can be molded directly into flap section 10. Reflector 11 is secured to surface 12 of flap section 10. Attachment means, in the form of connecting openings 3, are located through flap section 2, to attach mud flap 1 to vehicle 100.

It is also contemplated that, in lieu of using two magnets on a single mud flap, one of the flap sections of the mud flap can comprise a magnet and the other flap section can comprise a metal member of iron or like magnetic material which is attached to magnets. Thus, magnet 8 shown in the FIGS. can comprise a magnetic material metal member which is attracted and attached to magnet 16, or, alternatively magnet 16 can comprise a magnetic material metal member which is attracted and attached to magnet 8.

Figure 6:
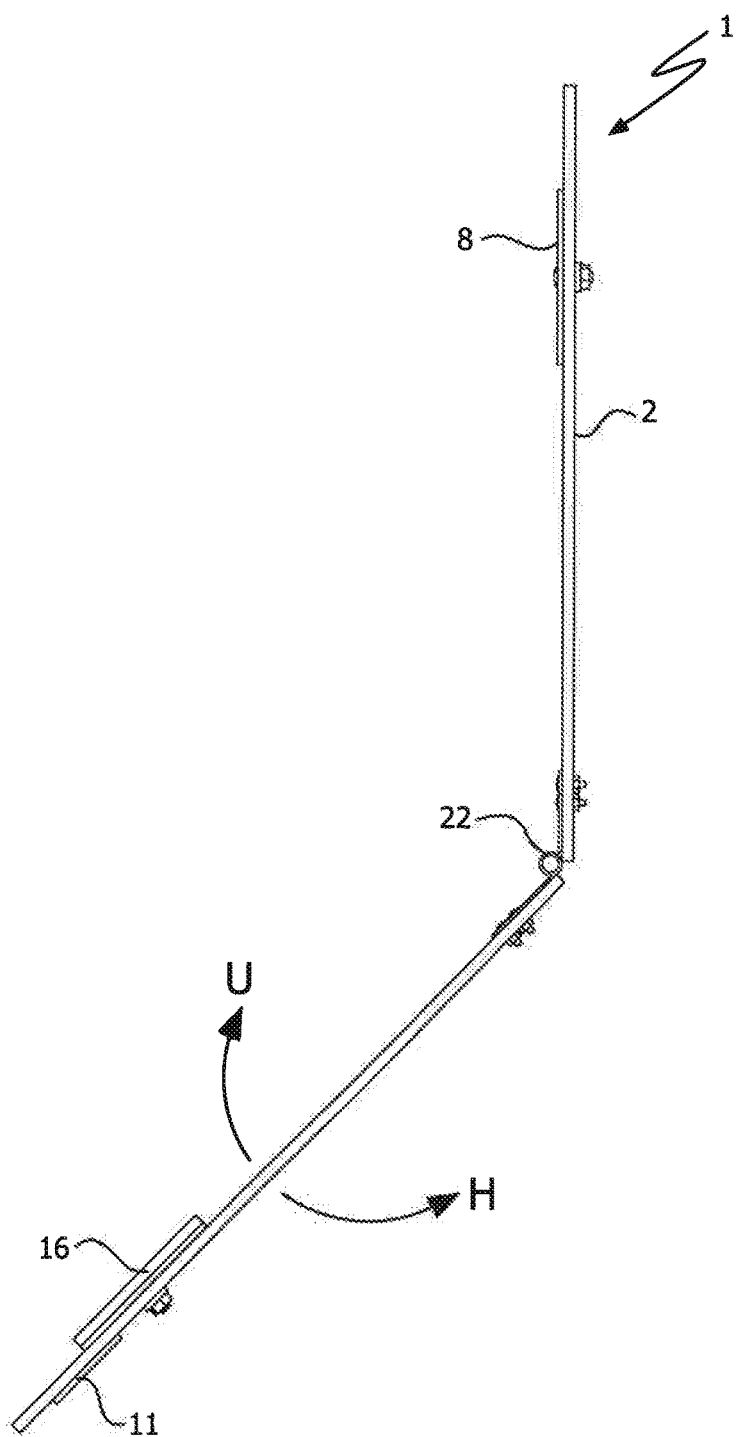
FIG. 6 is an elevation view of the mud flap of the present invention showing the rotatable nature of the mud flap.

Hinges 20 and 22 are secured between flap sections 2 and 10. It is contemplated that any equivalent hinge configuration can be used, e.g. a hinge which extends the entire abutment length L between flap sections 2 and 10, two way rotational hinges, etc. Hinges 20 and 22 allow rotation of flap section 10 about flap section. Flap section 10 is thus rotatable forward from a hanging, first position in which it extends directly below and is in the same transverse plane as flap section 2 (FIG. 4), to an upwardly extending second position in which flap section 10, with its rear surface 14, is rotated forward such that it is parallel to face flap section 2. In this position, rear surface 6 is parallel to and directly faces rear surface 14 (FIG. 5). FIG. 6 shows mud flap 1 in the process of both upward rotation U to attain the position shown in FIG. 5 and rotation H to attain the hanging position shown in FIG. 4.

When mud flap 1 is rotated into the second position, magnets 8 and 16 attract and attach to rigidly maintain flaps 2 and 10 in this position, up and away from rear wheels 102 and 103 of truck 100, to prevent dump 104 from contacting mud flap 1, shown in the hanging position in FIG. 1 and mud flap 1a, shown in FIG. 1 in the "folded" position. Although magnets 8 and 16 securely maintain mud flap 1 in the folded second position, the magnets are not so strong that flap sections 2 and 10 cannot be manually pulled apart, to allow flap section 10 to be rotated down to the downwardly hanging first position.

While magnets 8 and 16 are shown as being attached to rear surfaces 6 and 14 of flap sections 2 and 10, it is contemplated that the magnets can be attached to front surfaces 4 and 12. This will allow flap section 2 to rotate rearward, such that surfaces 4 and 12 face each other. Alternatively, when two way rotational hinges are used, magnets can be positioned on both front flap surfaces 4 and 12, and rear flap surfaces 6 and 14. This permits both forward and rearward rotation of flap section 10, thereby allowing the flap section to be secured such that the front flap surfaces face each other or the rear flap surfaces face each other.

Certain novel features and components of this invention are disclosed in detail in order to make the invention clear in at least one form thereof. However, it is to be clearly understood, that the invention as disclosed is not necessarily limited to the exact form and details as disclosed, since it is apparent that various modifications and changes may be made without departing from the spirit of the invention.

The invention claimed is:

1. A mud flap for a vehicle comprising:
   an upper flap section having a front surface and a rear surface, a first magnet permanently attached to the flap section, and an attachment means for securing the upper flap section to a vehicle; and
   a lower flap section having a front surface and a rear surface, and a second magnet permanently attached to the lower flap section, said lower flap section secured to the upper flap section by hinge means for allowing rotation of the lower flap section in relation to the upper flap section, whereby the lower flap section is rotatable from a first position in which it extends and hangs below the upper flap section, to a second position wherein the lower flap section is parallel to the upper flap section and the lower flap section is secured to the upper flap section by the attachment of the first and second magnets.

2. The mud flap as in claim 1 wherein the first magnet is secured to the rear surface of the upper flap section and the second magnet is secured to the rear surface of the lower flap section.

3. The mud flap as in claim 1 wherein the rear surface of the lower flap section is parallel to and directly faces the rear surface of the upper flap section in the second position.

4. The mud flap as in claim 3 wherein the first magnet is secured to the rear surface of the upper flap section and the second magnet is secured to the rear surface of the lower flap section.

5. The mud flap as in claim 1 wherein the upper flap section abuts the lower flap section along the lengths of the flap sections.

6. A mud flap for a vehicle comprising:
   an upper flap section having a front surface and a rear surface, a magnet permanently attached to the flap section, and an attachment means for securing the flap section to a vehicle; and
   a lower flap section having a front surface and a rear surface, and a metal member of magnetic material permanently attached to the lower flap section, said lower flap section secured to the upper flap section by hinge means for allowing rotation of the lower flap section in relation to the upper flap section, whereby the lower flap section is rotatable from a first position in which it extends and hangs below the upper flap section, to a second position wherein the lower flap section is parallel to the upper flap section and the lower flap section is secured to the upper flap section by the attachment of the magnet and the metal member.

7. The mud flap as in claim 6 wherein the magnet is secured to the rear surface of the upper flap section and the metal member is secured to the rear surface of the lower flap section.

8. The mud flap as in claim 6 wherein the rear surface of the lower flap section is parallel to and directly faces the rear surface of the upper flap section in the second position.

9. The mud flap as in claim 8 wherein the magnet is secured to the rear surface of the upper flap section and the metal member is secured to the ream surface of the lower flap section.

10. The mud flap as in claim 6 wherein the upper flap section abuts the lower flap section along the lengths of the flap sections.

11. A mud flap for a vehicle comprising:
    an upper flap section having a front surface and a rear surface, a metal member of magnetic material permanently attached to the flap section, and an attachment means for securing the flap section to a vehicle; and
    a lower flap section having a front surface and a rear surface, and a magnet permanently attached to the lower flap section, said lower flap section secured to the upper flap section by hinge means for allowing rotation of the lower flap section in relation to the upper flap section, whereby the lower flap section is rotatable from a first position in which it extends and hangs below the upper flap section, to a second position wherein the lower flap section is parallel to the upper flap section and the lower flap section is secured to the upper flap section by the attachment of the magnet and the metal member.

12. The mud flap as in claim 11 wherein the magnet is secured to the rear surface of the upper flap section and the metal member is secured to the rear surface of the lower flap section.

13. The mud flap as in claim 11 wherein the rear surface of the lower flap section is parallel to and directly faces the rear surface of the upper flap section in the second position.

14. The mud flap as in claim 13 wherein the magnet is secured to the rear surface of the upper flap section and the metal member is secured to the rear surface of the lower flap section.

15. The mud flap as in claim 11 wherein the upper flap section abuts the lower flap section along the lengths of the flap sections.

* * * * *